(12) United States Patent
Elstorpff et al.

(10) Patent No.: US 9,278,701 B2
(45) Date of Patent: Mar. 8, 2016

(54) BRAKE SYSTEM HAVING AN ELECTROMAGNETIC TRACK BRAKE DEVICE

(75) Inventors: Marc-Gregory Elstorpff, Munich (DE); Henry Lehmann, Hinterbrühl (AT); Richard Rathammer, Stillfried-Grub (AT)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 6 days.

(21) Appl. No.: 14/238,007

(22) PCT Filed: Aug. 10, 2012

(86) PCT No.: PCT/EP2012/065663
§ 371 (c)(1),
(2), (4) Date: May 22, 2014

(87) PCT Pub. No.: WO2013/024016
PCT Pub. Date: Feb. 21, 2013

(65) Prior Publication Data
US 2014/0246282 A1 Sep. 4, 2014

(30) Foreign Application Priority Data
Aug. 12, 2011 (DE) .......................... 10 2011 110 053

(51) Int. Cl.
| B61H 7/08 | (2006.01) |
| B60T 8/17 | (2006.01) |
| B60T 13/74 | (2006.01) |
| B60T 17/22 | (2006.01) |
| F16D 63/00 | (2006.01) |

(52) U.S. Cl.
CPC ................ B61H 7/08 (2013.01); B60T 8/1705 (2013.01); B60T 13/748 (2013.01); B60T 17/228 (2013.01); F16D 63/008 (2013.01)

(58) Field of Classification Search
CPC ........ B61H 7/00; B61H 7/08; B60L 2200/26; B60T 8/1705; B60T 17/228
See application file for complete search history.

(56) References Cited

U.S. PATENT DOCUMENTS

| 2,068,338 | A | * | 1/1937 | Hewitt ............................... 303/3 |
| 2,088,186 | A | * | 7/1937 | Bush .................................. 303/3 |
| 2,127,429 | A | * | 8/1938 | Schoepf et al. ................... 303/3 |

(Continued)

FOREIGN PATENT DOCUMENTS

| DE | 1011455 B | 7/1957 |
| DE | 2306156 A1 | 8/1973 |
| DE | 102005016164 A1 | 10/2006 |
| EP | 1712445 A1 | 10/2006 |
| EP | 1746000 A2 | 1/2007 |
| GB | 1270327 A | 4/1972 |
| WO | WO2010025892 | * 11/2010 |

OTHER PUBLICATIONS

Search Report for International Patent Application No. PCT/EP2012/065663; Feb. 28, 2013.

(Continued)

*Primary Examiner* — Vishal Sahni
(74) *Attorney, Agent, or Firm* — Barnes & Thornburg LLP

(57) ABSTRACT

A brake control device for a brake system of a rail vehicle, wherein the brake control device is designed to control at least one electromagnetic track brake device of the brake system on the basis of rail condition data. Also disclosed is a corresponding brake system, a rail vehicle, and a corresponding method.

13 Claims, 2 Drawing Sheets

(56) References Cited

U.S. PATENT DOCUMENTS

| | | | | |
|---|---|---|---|---|
| 2,176,748 | A | * | 10/1939 | Schoepf et al. .................... 303/3 |
| 2,368,726 | A | * | 2/1945 | Piron ............................... 188/35 |
| 2,747,693 | A | * | 5/1956 | Hines ............................... 188/33 |
| 3,899,979 | A | * | 8/1975 | Godsey, Jr. .................... 104/283 |
| 5,676,337 | A | * | 10/1997 | Giras et al. ................ 246/182 A |
| 6,629,709 | B1 | * | 10/2003 | Tunley .................. B61C 15/107 188/35 |
| 2014/0190512 | A1 | * | 7/2014 | Elstorpff .................. B61H 7/08 134/1 |
| 2014/0222258 | A1 | * | 8/2014 | Elstorpff ............... B60T 8/1705 701/19 |

OTHER PUBLICATIONS

International Preliminary Report on Patentability and Written Opinion of the International Search Authority for International Patent Application No. PCT/EP2012/065663, dated Aug. 10, 2012.

English Translation of International Preliminary Report on Patentability and Written Opinion of the International Search Authority for International Patent Application No. PCT/EP2012/065663, dated Aug. 10, 2012.

* cited by examiner

BRAKE SYSTEM HAVING AN ELECTROMAGNETIC TRACK BRAKE DEVICE

PRIORITY CLAIM

This patent application is a U.S. National Phase of International Patent Application No. PCT/EP2012/065663, filed 10 Aug. 2012, which claims priority to German Patent Application No. 10 2011 110 053.2, filed 12 Aug. 2011, the disclosures of which are incorporated herein by reference in their entirety.

FIELD

Disclosed embodiments relate to a brake control device for a brake system of a rail vehicle having a magnetic track brake device, to a brake system having a brake control device of this kind, to a rail vehicle, and also to a method for controlling at least one magnetic track brake device of a brake system of a rail vehicle.

BACKGROUND

Modern rail vehicles often have brake systems having a plurality of brake devices which act in different ways. A friction brake device, such as a pressure-operated brake device, for example a hydraulic or pneumatic brake, or an electric or electromagnetic brake is generally provided as the service brake to be used primarily. Besides this, eddy current brakes, retarders or else magnetic track brakes, amongst others, are additionally used. In contrast to the eddy current brake, the magnetic track brake device here is a friction brake device which, when it is operated, is brought into frictional contact with the rail. As a result of current being applied, the magnetic track brake device is magnetized and adheres strongly to the rail. The magnetic track brake device is subject to considerable wear in the process. Magnetic track brake devices are used for supporting the braking action of the normal service brake device, in particular when carrying out rapid braking or emergency braking.

Disclosed embodiments allow improved operation of a magnetic track brake device. In particular, wear of the magnetic track brake device is intended to be reduced in the process during braking.

SUMMARY

Within the scope of the disclosed embodiments, a rail vehicle can denote one or more carriages with or without their own drive and/or a traction vehicle in any desired combination. In particular, a rail vehicle can have rail cars. A rail vehicle or a carriage of a rail vehicle can have bogies on which wheel axles of the vehicle are arranged. The bogies can be attached to a carriage structure. A brake system can have at least a magnetic track brake device and a service brake device. The service brake device may be an adhesion-dependent friction brake device which can transmit a braking force via a wheel/rail contact. A magnetic track brake device is not an adhesion-dependent brake device in this sense since it does not transmit its braking force via a wheel/rail contact, but rather can establish its own frictional contact with the rail. An adhesion-dependent friction brake device can have a force generator which, when it is operated, exerts a force for braking a wheel, which is associated with the force generator, or a wheel axle. The force generator can be operable by a hydraulic or pneumatic brake pressure or a brake current. The service brake device can accordingly be a pressure-operated, that is to say a hydraulic or pneumatic, or an electrically operated brake device, such as an electromechanical brake device. A magnetic track brake device can comprise, as components, one or more solenoids which can be brought into contact with a rail and to which current can be applied. When current is applied, the solenoid or solenoids of the magnetic track brake device can adhere to the rail by virtue of a magnetic effect. It is conceivable that a magnetic track brake device has at least one mechanical and/or pneumatic and/or hydraulic operating device as a component. An operating device of this kind may be suitable for moving the solenoid or solenoids and/or frictional component or components of the magnetic track brake device from an inoperative position to a braking position, and vice versa. Provision may be made for operating devices of this kind to be actuated or operated pneumatically, hydraulically or electrically, for example by a brake control device. A frictional component of the magnetic track brake device can be provided for the purpose of being in frictional contact with the rail when braking is performed by means of the magnetic track brake device. A frictional component of this kind may be a solenoid or be attached to a solenoid. A service brake device can be, in particular, a pressure-operated brake device, for example a pneumatic or hydraulic brake device. In a brake device of this kind, a braking pressure can be generated, by means of which frictional elements of friction brake devices can be brought into frictional contact with one another to brake wheels and the vehicle. A service brake device can also be an electrical or electromechanical brake device. In a brake device of this kind, a braking current can be generated, by means of which frictional elements of friction brake devices can be brought into frictional contact with one another to brake wheels and the vehicle. Typical examples of service brakes of this kind are disk brakes, block brakes or a combination of disk and block brakes. In a pressure-operated service brake device, a braking pressure is consequently converted into heat by exerting a braking force on frictional elements while in an electrically operated service brake device, a braking current is converted into heat by exerting a braking force on frictional elements. In the event of braking, braking torques or braking forces exerted by the service brake device are absorbed via the wheel/rail contact. The amount of braking torque or braking force which can be absorbed via this wheel/rail contact is limited by a parameter which is generally called the adhesion coefficient. For a single wheel, this value depends on the loading on the wheel by a weight which bears on it and in particular depends on the contact conditions between wheel and rail. The adhesion coefficient may be very low, particularly when an intermediate layer, for example a layer of water or leaves, is formed between wheel and rail. Furthermore, the adhesion coefficient is highly dependent on a prevailing wheel slip. In this case, the wheel slip S is defined as S=(vT−vR)/vT, wherein vT denotes the translation speed of the rail vehicle and vR denotes the rotation speed of the wheel in question. If the wheel slip S of a wheel is exactly 0, no braking or acceleration force can be transmitted via this wheel. In general, the wheel in question can be driven to slide, lock or spin when, at a given prevailing adhesion coefficient, a braking force or an acceleration force which is above the force which can be transmitted at the prevailing adhesion coefficient is exerted on the wheel. Therefore, particularly in the event of a braking operation, care should generally be taken that the braking force which can be transmitted according to the prevailing adhesion coefficient is not exceeded. A service brake device can have an associated sliding protection apparatus which is designed to detect and possibly counteract sliding and/or locking of the wheels. To this end, outlet valves can be provided, for example in pneumatic service brake devices, the outlet valves reducing the braking pressure at suitable points when the sliding protection device is triggered, to reduce the transmitted braking force. A brake control device can be designed to actuate a magnetic track brake device. In this case, the brake control device can be provided separately for the magnetic track brake device. A brake control device can also be designed to actuate other brake devices of the brake system, such as the service brake device for example. The brake control device may be an electronic control device, such as a brake computer for instance. It is conceivable for a brake control device for actuating the magnetic track brake device to comprise a plurality of separate control units which can be associated with different solenoids and/or operating devices of the magnetic track brake device. Actuation of the magnetic track brake device can comprise, in particular, electrical and/or pneumatic and/or hydraulic and/or electrohydraulic and/or electropneumatic actuation of operating devices of the magnetic track brake device. In this case, one or more solenoids can be moved between an inoperative position and a braking position by actuating the operating devices. When current is applied to the solenoid, frictional contact can be made between the magnetic track brake device and the rail. In this case, frictional components can be moved from the braking position into contact with the rail by solenoids. It is also conceivable for there to already be contact between magnetic track brake device and/or a frictional component and the rail in the braking position, this contact being strengthened by a current being applied. Current is expediently applied when the at least one solenoid which is to be actuated is in a braking position. In some vehicles, provision can also be made for the magnetic track brake device or its solenoids to already be close enough to the rail in the inoperative position that, when current is applied, frictional contact is made between the magnetic track brake device or at least one frictional component and the rail. In a case of this kind, an operating device can be dispensed with, and the inoperative position and the braking position can be the same. In particular, actuation of the magnetic track brake device can comprise applying current and/or deliberately supplying current and/or interrupting the supply of current to one or more solenoids of the magnetic track brake device. In general, activation and/or operation of a magnetic track brake device can comprise actuation of components of the magnetic track brake device in such a way that frictional contact is made between rail and magnetic track brake device, for example by actuating at least one operating device to move the magnetic track brake device to a braking position, and/or actuation for supplying current to one or more solenoids. Deactivation and/or release of a magnetic track brake device can comprise actuation of components of the magnetic track brake device in such a way that frictional contact is interrupted. In this case, supplying current to one or more solenoids can be interrupted and/or an operating device can move at least one component of the magnetic track brake device from a braking position to an inoperative position. It is conceivable for a magnetic track brake device to have a plurality of frictional components which can be actuated separately from one another and/or operating devices and/or solenoids. Therefore, a magnetic track brake device can be partially released and partially operated. Actuation can be performed according to prespecified braking parameters which can be provided, for example, by a central control device. In general, state data can be data which describes one or more specific parameters and/or state values of the rail vehicle and/or the rail. Rail state data can describe state data which relates to the rail. Rail state data can describe, in particular, a state which relates to mechanical contact between the rail and parts of the rail vehicle, in particular wheels. State data can describe, for example, a wheel slip, an adhesion coefficient, the situation of a specific value, such as an adhesion coefficient, being exceeded or undershot, a vehicle speed, a wheel rotation speed, a braking action, such as a braking force or a braking torque, etc. In this case, the rail state data can be considered to be, in particular, wheel slip data and data relating to an adhesion coefficient. State data can be based on sensor values or be sensor values which are provided by suitable sensor devices. By way of example, a brake system can be connected or connectable to a sensor device, and/or a sensor device can be associated with the brake system. In this case, a sensor device can comprise, for example, wheel rotation speed sensors and/or speed sensors and/or braking action sensors, for example braking force sensors and/or braking torque sensors, and/or deceleration sensors and/or acceleration sensors. A brake control device of the brake system can be designed to receive state data and/or sensor values. It is conceivable for sensor values to represent state data and/or for state data to be determined based on sensor values. State data can be determined, for example, by a suitable control device, for example by the brake control device of the brake system. Determining state data can comprise receiving sensor values and/or evaluating sensor values, in particular calculating state data based on sensor values. It is also conceivable for a control device of the brake system, in particular the brake control device, to be connected to the sensor device and/or other control devices for data transmission purposes, to receive or to send, for example, sensor values and/or state data and/or operating parameters.

BRIEF DESCRIPTION OF THE FIGURES

The invention will now be explained by way of example using disclosed embodiments with reference to the accompanying drawings, in which.

DETAILED DESCRIPTION OF THE DISCLOSED EMBODIMENTS

Figure 1:
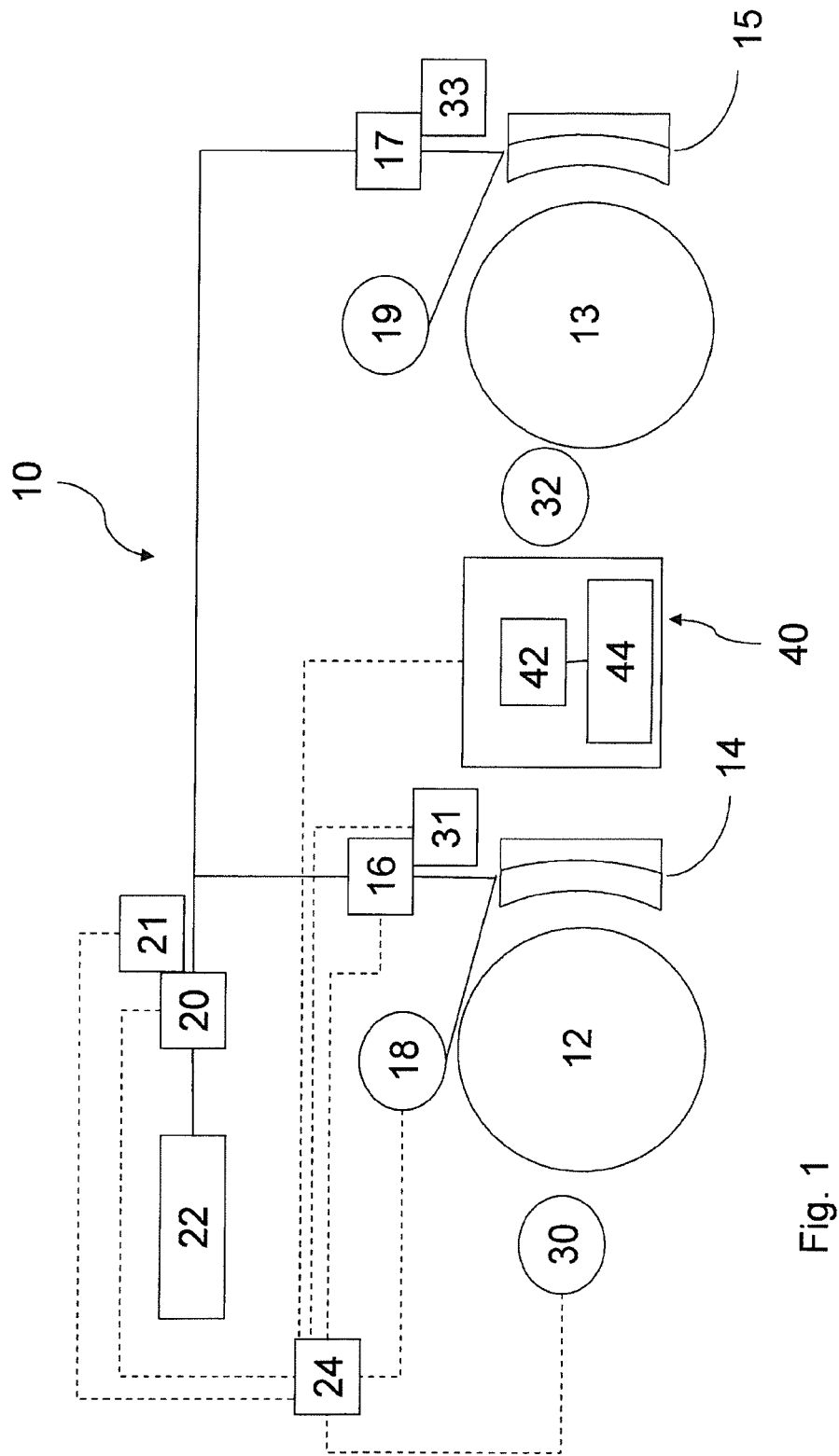
FIG. 1 shows a schematic illustration of a brake system of a rail vehicle having a brake control device.

Disclosed embodiments relate to a brake control device for a brake system of a rail vehicle, wherein the brake control device is designed to actuate at least one magnetic track brake device of the brake system based on rail state data. Thus, during actuation of the magnetic track brake device, the state of the rail can be taken into consideration, in particular the state of the contact between one or more wheels and the rail. A service brake device can be part of the brake system. In general, the brake system can have at least one further brake device which is not a magnetic track brake device. The rail state data can originate from a service brake device and/or relate to components of a service brake device. In particular, rail state data can be based on sensor values from sensors and/or a sensor device which are associated with components of a service brake device. The magnetic track brake device can be actuated during braking, in particular during service braking or adaptive braking. It is also conceivable for actuation to be performed during rapid braking or emergency braking. Speed adjustment is carried out during service braking, the brake system generally not being subjected to full load during the speed adjustment. During rapid or emergency braking however, as much braking force as possible is applied to brake or stop the vehicle as quickly as possible. In this case, in particular, friction brake devices, such as the magnetic track brake device, or a pressure-operated brake device are subjected to considerable loading and considerable wear. During service braking however, it is generally not necessary to generate a maximum braking force. Provision can be made for the brake control device to be designed to actuate the magnetic track brake device separately and/or independently of a service brake device and/or further brake devices. The brake control device can be designed to operate the magnetic track brake device during service braking in such a way that the magnetic track brake device is not operated and/or supplied with current during the entire braking process. In particular, provision can be made for the brake control device to be designed to actuate the magnetic track brake device before braking, such as service braking, is complete, in such a way that it does not make any further contribution to braking. To this end, the magnetic track brake device can, for example, be returned to its inoperative position and/or moved out of the braking position. In particular a service brake device and/or at least one further brake device can be operated during service braking, so that the duration of service braking can be defined by the time for which the service brake device and/or the at least one further brake device is operated. Provision can be made for the brake control device to be designed to take into account state data which can relate, in particular, to another brake device, for example a pressure-operated service brake device, during the actuation of the magnetic track brake device. It may be expedient when the brake control device can actuate supply of current to the magnetic track brake device at a varying current intensity during braking, in particular service braking. Therefore, less current can be supplied, for example, during braking taking into account an improving rail state, as a result of which the magnetic track brake device is subjected to less wear. In general, the magnetic track brake device can be arranged upstream, in the direction of travel, of the at least one wheel which is to be braked by a further braking device, in particular upstream of a wheel which is to be braked by a service brake device. If the magnetic track brake device is actuated for a braking operation, the magnetic track brake device is brought into frictional contact with the rail. It is expedient when frictional contact is made between the magnetic track brake device and a frictional surface of the rail which subsequently also comes into frictional contact with at least one wheel surface of the vehicle. The profiles of the magnetic track brake device and/or of the wheels can be of corresponding design. On account of the contact between the magnetic track brake device and the frictional surface of the rail, the rail is freed and cleaned of intermediate layers. Therefore, by virtue of using the magnetic track brake device, the adhesion coefficient between downstream wheels and the rail can be improved. On account of the improved adhesion coefficient, a higher braking force can be transmitted to the rail by means of the wheels, as a result of which the service brake device and/or a further brake device can generate a greater proportion of a required braking force. Therefore, the magnetic track brake device can be relieved of load by, for example, less current being supplied to the magnetic track brake device or the magnetic track brake device being deactivated, that is to say actuated in such a way that it no longer performs braking, by the brake control device before braking by the service brake device or further brake device is complete. In general, the brake control device can be designed to monitor a rail state during a braking process and to actuate the magnetic track brake device based on a change rail state data which corresponds to the rail state. Provision can be made for the brake control device to be designed to monitor whether the rail state data reaches a specific prespecified threshold value, for example whether it exceeds or falls below a threshold value, during the braking process and/or during braking. The brake control device can be designed to activate or to deactivate the magnetic track device when a threshold value is reached. Provision can be made for the brake control device to be designed to activate the magnetic track device when a first threshold value is reached and to deactivate the magnetic track device when a second threshold value is reached. A threshold value can be calculated and/or determined as a function of a braking request and/or a desired deceleration and/or a vehicle speed. Provision can be made for the brake control device to be designed to monitor the rail state data. A braking request and/or desired deceleration can be provided, for example, by a train computer and/or by a train driver.

The brake control device can be designed to actuate the magnetic track brake device based on speed data. The speed data can relate, in particular, to a vehicle speed. The speed data can be state data which is acquired by a suitable sensor device, for example by speed sensors and/or based on data from wheel rotation speed sensors. The speed data can be transmittable by a further control device which is connected to the brake control device for data transmission purposes. Therefore, the current speed during braking can also be taken into consideration for the magnetic track brake device. In particular at high vehicle speeds, the vehicle speed can also have a big influence on the rail state, in particular on an adhesion coefficient. As an alternative or in addition, the brake control device can be designed to actuate the magnetic track brake device based on state data which describes a braking force which is exerted by a service brake device and/or a corresponding braking torque. State data of this kind can be based on sensor values which is determined and provided by at least one braking action sensor, such as a braking force sensor and/or a braking torque sensor. Corresponding sensors can be associated with the brake system for monitoring the service brake device.

It is conceivable for the rail state data to comprise wheel slip data. A particularly important parameter for the adhesion coefficient can thereby be taken into consideration. The wheel slip data can relate to a single wheel or a plurality of wheels. It is conceivable, in particular, for the wheel slip data to relate to the wheel slip of a wheel or a wheel axle which are arranged downstream of the magnetic track brake device or a corresponding frictional component in the direction of travel, without further wheels being arranged between magnetic track brake device or a corresponding frictional component and the wheel or wheels in question. Therefore, magnetic track brake devices or the frictional component and the wheels are situated physically close to one another, and the wheel slip data can be representative of the rail state close to the magnetic track brake device or of the frictional component. As an alternative or in addition, the wheel slip data can also relate to at least one wheel which is arranged upstream of the magnetic track brake device or a corresponding frictional component in the direction of travel.

In a development, provision can be made for the rail state data to be able to be transmitted to the brake control device by an antiskid device. Therefore, the rail state data can be transmitted by the antiskid device. An antiskid device of this kind is generally designed, in particular, to identify locking of a wheel. The antiskid device can be designed to generate a corresponding signal, which can be considered to represent a rail state, when a wheel locks or skids and/or when an antiskid means is triggered. This is because more braking force is exerted on the wheel in the event of locking or skidding of a wheel than can be absorbed by means of the wheel/rail contact, as a result of which conclusions can be drawn about the adhesion coefficient or a specific adhesion being exceeded. Conversely, when the antiskid device identifies that locking has ended, a corresponding signal can be transmitted to the brake control device. This is because it is also analogously possible to draw conclusions from the antiskid means being released or activation of the antiskid means being terminated about an adhesion coefficient or an adhesion being exceeded. Therefore, sensors which are already present for an antiskid device or signals provided by the sensors or state data can be used as rail state data for the brake control device of the magnetic track brake device. The antiskid device can have, for example, wheel rotation speed sensors and/or valves for reducing a braking pressure.

It may be particularly expedient when the rail state data relates to wheels which are arranged upstream of the at least one magnetic track brake device and/or an associated frictional component in the direction of travel of the rail vehicle. In particular, the rail state data can relate to wheels which are arranged upstream of one or more solenoids of the magnetic track brake device, which can establish contact with the rail, in the direction of travel. In this case, the rail state data describes the contact between the rail and wheels which are arranged upstream of the magnetic track brake device. The data therefore describes a rail state upstream of the magnetic track brake device in the direction of travel, which rail state can therefore at least influence subsequent wheels by use of the magnetic track brake device. In this case, it may be particularly expedient when the magnetic track brake device or at least one frictional component of the magnetic track brake device is arranged between several wheels as seen in the longitudinal direction or direction of travel of the rail vehicle. In this case, the wheels can be arranged on a common bogie on which at least one frictional component and/or one solenoid of the magnetic track brake device can also be arranged. It may be expedient when the brake control device is designed to actuate the magnetic track brake device based on rail state data which relates to the rail state upstream of the magnetic track brake device.

The brake control device can be designed to deactivate the magnetic track brake device when predefined rail state conditions are reached. Deactivation can comprise, in particular, interrupting a supply of current and/or actuating an operating device of the magnetic track brake device in such a way that the magnetic track brake device is moved to its inoperative position. The predefined rail state conditions can relate, for example, to a specific adhesion coefficient which has to be present that the service brake device is able to generate the desired braking action. The contribution of further brake devices, such as a linear eddy-current brake device for example, may be taken into consideration in the process.

In particular, provision can be made for the rail state data to relate at least to an adhesion and/or an adhesion coefficient. Therefore, this value which is important for braking can be taken into consideration, in particular, during service braking or adaptive braking to preserve the magnetic track brake device. It is conceivable for the brake control device to be designed to actuate the magnetic track brake device in an adhesion-dependent manner. The adhesion coefficient can be determined and/or calculated based on data from an antiskid device and/or data from wheel rotation speed sensors and/or wheel slip data and/or braking action data, such as braking force data and/or braking torque data, in particular in conjunction with braking pressure data and/or braking current data. Provision can be made for the brake control device to be designed to monitor an adhesion coefficient for at least one wheel during braking. If the frictional contact between the at least one wheel and the rail is improved by the use of the magnetic track brake device such that the adhesion coefficient exceeds a specific threshold value, the brake control device can deactivate the magnetic track brake device or reduce the amount of current applied to it. Several threshold values can be defined, it being possible for a different amount of current to be applied in each case when the threshold values are exceeded.

Disclosed embodiments also relate to a brake system for a rail vehicle having at least one magnetic track brake device and a brake control device which is described in this document. The brake control device can be designed to actuate the magnetic track brake device. It is conceivable for the brake system to be a brake system which is described in this document. The brake system can comprise at least one further brake device which can be, in particular, a service brake device. The service brake device can be an electrically operated or pressure-operated service brake device, in particular a pneumatic or hydraulic service brake device. The service brake device and possibly further brake devices, for example a linear eddy-current brake device, can be actuable by an electronic control device. The control device can be the brake control device. It is conceivable for the brake control device to comprise the control devices for the further brake devices. Suitable sensors of a sensor device can be associated with the brake devices of the brake system. The sensor device can be a component of the brake system. Sensors can be, for example, wheel rotation speed sensors and/or braking action sensors, for example braking force sensors and/or braking torque sensors, and/or speed sensors and/or braking pressure sensors and/or braking current sensors.

Disclosed embodiments also relate to a rail vehicle having a brake system which is described in this document and/or having a brake control device which is described in this document.

Disclosed embodiments also relate to a method for actuating at least one magnetic track brake device of a brake system of a rail vehicle, in which method the at least one magnetic track brake device is actuated by a brake control device based on rail state data. The brake control device can be a brake control device which is described in this document. The brake system can be a brake system which is described in this document. Furthermore, the magnetic track brake device can be a magnetic track brake device which is described in this document. The brake control device can actuate the magnetic track brake device based on speed data. The rail state data can comprise wheel slip data. It is conceivable for the rail state data to be transmitted by an antiskid device. The rail state data can relate to the wheels which are arranged upstream of the at least one magnetic track brake device in the direction of travel of the rail vehicle. The brake control device can deactivate the magnetic track brake device when predefined rail state conditions are reached. It is conceivable for the rail state data to relate to or comprise adhesion and/or an adhesion coefficient.

FIG. 1 schematically shows a brake system 10 of a rail vehicle having a pneumatic service brake. Mechanical and pneumatic connections and lines are illustrated using solid lines, whereas electrical connections or communications channels are illustrated using dashed lines. The brake system 10 is provided for the purpose of braking wheels 12 and 13 of the rail vehicle. In this example, the wheels 12 and 13 are located on different wheel axles, but on one bogie. The first wheel 12 has an associated first brake block 14. The second wheel 13 has an associated second brake block 15. Each of the brake blocks 14, 15 has a brake lining which brakes the associated wheel when the brake block is pressed against the running surface of the associated wheel 12, 13 by way of the brake lining. The brake block 14 can be operated by a force generator 16 for braking purposes. The force generator 16 is connected to a main control valve device 20 via a supply line. Compressed air can be fed to the force generator 16 via the main control valve device 20. Similarly, the brake block 15 has an associated force generator 17 which can likewise be supplied with compressed air via the main control valve device 20 for the purpose of operating the force generator, to bring the brake block 15 into contact with the wheel running surface of the wheel 13. The main control valve device 20 is connected to a compressed air reservoir device 22 from which it can draw compressed air to provide the compressed air to the force generators 16, 17 during a braking operation. Also provided is an electronic brake control device 24 which is a brake computer and can actuate the main control valve device 20. To this end, the main control valve device 20 can have, in particular, one or more solenoid valves which can be actuated by the brake control device 24. The brake control device 24 can receive braking data, for example from a train computer. Braking data can relate to, for example, a braking request, vehicle speed and/or a desired deceleration operation. For reasons of clarity, the electrical control lines for the components which are associated with the second wheel are not illustrated. However, the control lines are comparable to the control lines which are associated with the first wheel and its components. The first wheel 12 also has an associated braking action sensor 18 which can determine a braking force which is exerted on the brake block 14 and/or a braking torque in the event of a braking operation. The braking action sensor 18 can therefore be considered to be a braking force sensor. A braking action sensor of this kind can have, for example, one or more strain gauges. The sensor 18 is connected to the electronic brake control device 24 to transmit data. Furthermore, the wheel 12 has an associated first wheel rotation speed sensor 30 which can detect the rotation speed of the wheel 12. This sensor is also connected to the electronic control device 24 for data transmission purposes. Analogously, the second wheel has an associated second braking action sensor 19 which can determine a braking force which is exerted on the brake block 15 and/or a braking torque. Furthermore, the second wheel 13 also has an associated second wheel rotation speed sensor 32. The sensors 18, 19 can each be considered to be part of a braking action sensor device. The wheel rotation speed sensors 30, 32 can each be considered to be part of a wheel rotation speed sensor device. The force generators 16, 17 can each comprise pneumatic cylinders which exert a braking force on the associated brake block 14, 15 when a braking pressure is applied to the pneumatic cylinders. The force generators 16, 17 can furthermore each have a control valve device which can be actuated by the electronic control device 24 and via which a main braking pressure, which is provided by the main control valve device 20, can be set individually for the respective pneumatic cylinders of the force generators 16, 17. Therefore, in particular, the force generators 16, 17 can apply different braking pressures to the brake blocks 14, 15 and therefore asymmetrically or separately operate or actuate the friction brake devices according to instructions from the electronic control device 24. The main control valve device 20 has an associated main braking pressure sensor 21 which can detect the main braking pressure which is provided by the main control valve device 20. The pressure sensor 21 is connected to the electronic control device 24 to transmit data. Furthermore, the force generator 16 has an associated first braking pressure sensor 31, and the second force generator 17 has an associated second braking pressure sensor 33. The first and the second braking pressure sensors 31, 33 are each designed to detect the braking pressure which is provided individually for the purpose of generating a braking force by the associated force generator 16, 17. The sensors 31, 33 and also the main braking pressure sensor 21 can be considered to be part of a braking pressure sensor device. The braking pressure sensors 21, 31, 33 are likewise connected to the electronic brake control device 24 for data transmission purposes. Therefore, the electronic brake control device 24 can firstly detect the introduced main braking pressure downstream of the main control valve device 20. Secondly, the brake control device 24 in each case receives the braking pressure which is active individually for generating braking force in the individual force generators 16, 17. In FIG. 1, the force generator 16 having the brake block 14 can be considered to be the first friction brake device. The force generator 17 and the second brake block 15 can be considered to be the second friction brake device. It goes without saying that the two friction brake devices can have associated brake linkages and suspensions which are not shown. The wheel rotation speed sensors 30, 32 and the control valve devices which are associated with the force generators 16, 17 can take on functions of an antiskid device and/or be considered to be parts of an antiskid device of this kind. The main control valve device 20 together with the friction brake devices can be considered to be a pneumatic brake apparatus, and in particular a service brake device. The wheel rotation speed sensors 30, 32, the braking action sensors 18, 19 and also the pressure sensors 21, 31, 33 can therefore each be considered to be sensors which are associated with corresponding components of the service brake device. Instead of being in the form of block brakes, the friction brake devices can also be in the form of disk brakes. A respective braking action sensor which can detect a braking force which is exerted during the braking operation and/or a braking torque and which can transmit corresponding braking data to the electronic brake control device 24 can also be provided in this case. The brake control device 24 is designed to receive braking action data from the braking action sensors 18, 19 and braking pressure data from the braking pressure sensors 21, 31, 33. Furthermore, the brake control device 24 assigns the braking pressure data to corresponding braking action data and monitors the associated data. The brake system 10 further comprises a magnetic track brake device 40 with an operating device 42 and a frictional component 44 which are arranged between the wheels 12, 13 on the same bogie. The operating device 42 is provided for the purpose of moving the frictional component 44 from an inoperative position to a braking position, and vice versa, in the event of corresponding actuation. In this example, the operating device 42 can convert a pneumatic pressure or a drop in the pneumatic pressure into a movement of the frictional component 44. The frictional component 44 has a solenoid which, when current is applied to it, can move the frictional component 44 out of the braking position and into frictional contact with the rail. The brake control device 24 is connected to the magnetic track brake device 40 for actuation purposes and can actuate, in particular, the operating device 42. Furthermore, the brake control device 24 is designed to actuate the application of current to the solenoid of the frictional component 44. Provision is made for the brake control device 24 to be able to actuate application of current at a variable current intensity, so that, depending on the actuated current intensity, there is a different level of frictional contact between rail and magnetic track brake device 40. For the purpose of supplying current, the frictional component 44 can be connected or connectable to the on-board electrical system of the rail vehicle and/or to a current source which is independent of the rail vehicle. The brake control device 24 is designed to actuate the magnetic track brake device 40 based on rail state data. The rail state data originates from sensors and/or is based on state data which is associated with the friction brake devices of the pneumatic brake apparatus of the brake system 10, that is to say of the service brake device. The state data is based, in particular, on data from the sensors 18, 19, 21, 30, 31, 32, 33. Provision is made for the brake control device to determine rail state data, which relates, in particular, to an adhesion between the wheels 12, 13 and the rail, based on data which is determined from the sensors. Therefore, the brake control device 24 can use data from the wheel rotation speed sensors 30, 32, and/or from a wheel slip which is determined on the basis of the data, to determine whether one of the wheels 12, 13 skids or is blocked. As an alternative or in addition, an adhesion coefficient which prevails for the wheels 12, 13 can be determined in each case. The brake control device 24 actuates the magnetic track brake device 40 in an adhesion-dependent manner based on rail state data of this kind.

Figure 2:
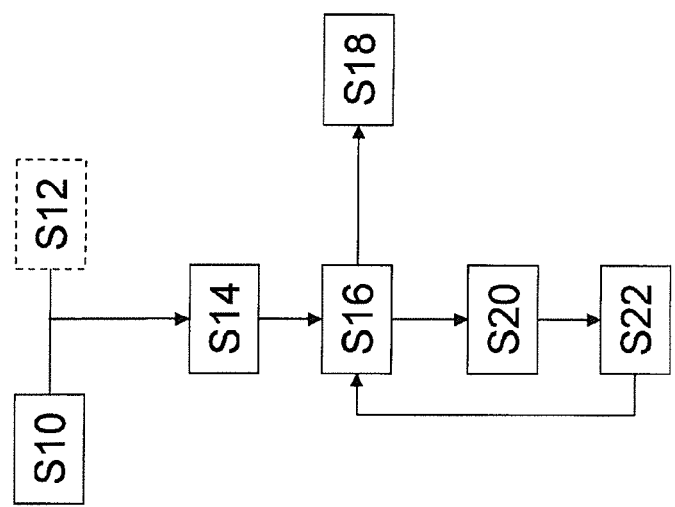
FIG. 2 shows a schematic flowchart of a method for actuating at least one magnetic track brake device.

FIG. 2 shows a flowchart of a method for actuating at least one magnetic track brake device of a brake system of a rail vehicle. The brake system can be, for example, a break system as shown in FIG. 1. In a step S10, a brake control device receives rail state data. Provision can be made for the brake control device to process the received rail state data in step S10 to determine, for example, a suitable subsequent actuation operation. In an optional step S12, which can follow step S10, can precede the step S10 or else can be performed parallel to the step S10, the brake control device can receive brake data. The brake data can indicate, for example, that braking should be performed, or that and/or the extent to which a service brake device or further brake devices should be operated. In a step S14, the brake control device adjusts the magnetic track brake device based on the data received in step S10 and possibly in step S12. The brake control device can actuate the magnetic track brake for braking particularly when braking should be carried out. In this case, the brake control device can optionally actuate operating devices to move corresponding elements of the magnetic track brake device to a position close to the rail or touching the rail. At the same time or subsequently, the brake control device can actuate a supply of current to the solenoids to create the frictional contact between the magnetic track brake device and the rail. In a subsequent step S16, the brake control device can receive further rail state data and/or brake data and/or state data of the vehicle. If it receives, for example, brake data which indicates that braking is complete, the brake control device can deactivate the magnetic track brake device in a subsequent step S18. If the brake data suggests that braking should continue to be performed, the brake control device can check in a step S20 whether predefined rail state conditions have been reached. This can be achieved by rail state data being compared with corresponding rail state conditions which can be stored, for example, in a memory device of the brake control device. If certain predefined rail state conditions are reached, for example if there is a predefinable minimum adhesion coefficient, the brake control device can, in a step S22, also deactivate the magnetic track brake device or at least supply less current to the magnetic track brake device while braking by the service brake device or further brake devices continues, to reduce the braking action of the magnetic track brake device and therefore also wear on the magnetic track brake device. Otherwise, braking by the magnetic track brake device can be continued, for example by returning to step S16.

The features of the invention which are disclosed in the preceding description, in the drawings and also in the claims may be essential for realizing the invention both individually and in any desired combination.

LIST OF REFERENCE SIGNS

10 Brake system
12 First wheel
13 Second wheel
14 First brake block
15 Second brake block
16 First force generator
17 Second force generator
18 First brake force sensor
19 Second brake force sensor
20 Main control valve device
21 Main brake pressure sensor
22 Compressed air reservoir device
24 Brake control device
30 First wheel rotation speed sensor
31 First brake pressure sensor
32 Second wheel rotation speed sensor
33 Second brake pressure sensor
40 Magnetic track brake device
42 Operating device
44 Frictional component

The invention claimed is:

1. A brake control device for a brake system of a rail vehicle, the brake control device comprising:
at least one brake force sensor and/or brake torque sensor configured to measure the at least one brake force and/or brake torque at at least one brake device,
wherein the brake control device is designed to actuate at least one magnetic track brake device of the brake system irrespective of actuation of the at least one brake device based on rail state data and based on brake force and/or brake torque data of the at least one brake device,
wherein the at least one brake device is a different brake than the at least one magnetic track brake,
wherein the rail state data comprises adhesion data calculated by the brake control device based on data received from a plurality of pressure sensors, and
wherein the data received from the plurality of pressure sensors comprises data received from pressure sensors at two brake blocks and from a main pressure sensor at a main valve device.

2. The brake control device of claim 1, wherein the brake control device is further designed to actuate the magnetic track brake device based on speed data.

3. The brake control device of claim 1, wherein the rail state data comprises wheel slip data.

4. The brake control device of claim 1, wherein the rail state data can be transmitted to the brake control device by an antiskid device.

5. The brake control device of claim 1, wherein the rail state data relates to wheels which are arranged downstream of the at least one magnetic track brake device and/or a frictional component of the magnetic track brake device in the direction of travel of the rail vehicle.

6. The brake control device of claim 1, wherein the brake control device is designed to deactivate the magnetic track brake device when predefined rail state conditions are reached.

7. The brake control device of claim 1, wherein the rail state data comprises at least an adhesion and/or adhesion coefficient.

8. The brake control device of claim 1, wherein the brake pressure and/or brake torque data relates to a pressure-operated service brake device.

9. The brake control device of claim 1, wherein the brake force and/or brake torque data relates to the at least one brake device which is arranged downstream of the at least one magnetic track brake device and/or a frictional component of the magnetic track brake device in the direction of travel of the rail vehicle.

10. The brake control device of claim 1, wherein the at least one magnetic track brake is configured to be activated by the brake control device to operate simultaneously with the at least one brake device.

11. A brake system for a rail vehicle comprising:
at least one magnetic track brake device, and
a brake control device designed to actuate the at least one magnetic track brake device irrespective of actuation of at least one other brake device of the brake system based on rail state data and based on brake force and/or brake torque data of the at least one other brake device,
wherein the rail state data comprises adhesion data calculated by the brake control device based on data received from a plurality of pressure sensors, and
wherein the data received from the plurality of pressure sensors comprises data received from pressure sensors at two brake blocks and from a main pressure sensor at a main valve device.

12. A rail vehicle comprising:
a brake system having at least one magnetic track brake device, the magnetic track brake device including a plurality of frictional components, and
a brake control device designed to selectively actuate the plurality of frictional components at the magnetic track brake device independent of actuation of at least one other brake device of the brake system based on rail state data and based on brake force and/or brake torque data of the at least the at least one other brake device,
wherein the plurality of frictional components are configured to be actuated separately from one another,
wherein the rail state data comprises adhesion data calculated by the brake control device based on data received from a plurality of pressure sensors, and
wherein the data received from the plurality of pressure sensors comprises data received from pressure sensors at two brake blocks and from a main pressure sensor at a main valve device.

13. A method for actuating at least one magnetic track brake device of a brake system of a rail vehicle comprising:
receiving rail state data at a brake control device;
receiving brake force and/or torque data of at least another brake device at the brake control device;
automatically adjusting a magnetic track brake device, while the at least another brake device continues to operate, based on the rail state data and the brake data;
receiving further rail state data and further brake force and/or torque data;
wherein in response to a determination that braking should continue based on the further brake force and/or torque data, the brake control device determines whether predefined rail state conditions have been reached based on the further rail state data and deactivates the magnetic track brake device,
wherein the rail state data comprises adhesion data calculated by the brake control device based on data received from a plurality of pressure sensors, and
wherein the data received from the plurality of pressure sensors comprises data received from pressure sensors at two brake blocks and from a main pressure sensor at a main valve device.

\* \* \* \* \*